(12) United States Patent
Beyreis (10) Patent No.: US 10,996,135 B1
(45) Date of Patent: May 4, 2021

(54) TEST FIXTURE AND METHOD OF LIQUID LEAK TESTING AN ELECTRONIC DEVICE

(71) Applicant: Inventus Power, Inc., Woodridge, IL (US)

(72) Inventor: Thomas James Beyreis, Arlington Heights, IL (US)

(73) Assignee: Inventus Power, Inc., Woodridge, IL (US)

( * ) Notice: Subject to any disclaimer, the term of this patent is extended or adjusted under 35 U.S.C. 154(b) by 0 days.

(21) Appl. No.: 17/157,275

(22) Filed: Jan. 25, 2021

(51) Int. Cl.
  *G01M 3/32* (2006.01)
  *G01M 3/16* (2006.01)
  *G01M 3/34* (2006.01)

(52) U.S. Cl.
  CPC ............ *G01M 3/3263* (2013.01); *G01M 3/16* (2013.01); *G01M 3/3209* (2013.01); *G01M 3/34* (2013.01)

(58) Field of Classification Search
  CPC .... G01M 3/16; G01M 3/3209; G01M 3/3263; G01M 3/3281; G01M 3/329; G01M 3/34
  See application file for complete search history.

(56) References Cited

U.S. PATENT DOCUMENTS

| | | | |
|---|---|---|---|
| 5,182,076 A | | 1/1993 | de Seroux et al. |
| 5,241,852 A | * | 9/1993 | Takahashi ............... G01M 3/10 73/45.5 |
| 6,279,382 B1 | | 8/2001 | Yatagai |
| 9,958,353 B2 | * | 5/2018 | Daniels ............... G01M 3/2853 |
| 10,631,422 B2 | | 4/2020 | Gilmore et al. |
| 2007/0157457 A1 | * | 7/2007 | Fried ................... G01M 3/3281 29/592.1 |
| 2010/0154516 A1 | * | 6/2010 | Hattori .................. G01M 3/329 73/40.7 |
| 2011/0126613 A1 | * | 6/2011 | Lin ........................ G03B 31/00 73/40 |
| 2012/0125085 A1 | * | 5/2012 | Wu ....................... G01M 3/329 73/38 |
| 2014/0076034 A1 | * | 3/2014 | Wu ......................... G01M 3/20 73/40.7 |
| 2015/0114090 A1 | | 4/2015 | Fukuda |
| 2018/0120195 A1 | * | 5/2018 | Kim ........................ H04M 1/24 |

FOREIGN PATENT DOCUMENTS

| | | |
|---|---|---|
| FR | 1510052 A | 1/1968 |
| WO | 18130564 A1 | 7/2018 |

* cited by examiner

*Primary Examiner* — Natalie Huls
(74) *Attorney, Agent, or Firm* — Banner & Witcoff, Ltd.

(57) ABSTRACT

A method and apparatus to ensure proper operation of an air permeable vent on an electronic device by allowing the vent and its surrounding area to be pressure decay leak tested using liquid to create the seal around the air permeable vent. The method may include filling a chamber with a known volume of liquid to cover the vent. Then, a remaining volume of air can be pressurized and monitored to detect a liquid leak either through the vent or through the sealing surface around or between the vent and the substrate of the electronic device. A pressure decay unit may adequately determine a leak rate to determine if the electronic device will pass or fail the required IP rating.

20 Claims, 8 Drawing Sheets

TEST FIXTURE AND METHOD OF LIQUID LEAK TESTING AN ELECTRONIC DEVICE

FIELD

Aspects described herein generally relate to an apparatus and method for detecting a leak in and around an air permeable vent. More specifically, aspects of this disclosure relate to a leak detection method to expedite testing of waterproof devices or devices that prevent liquid ingress, that include an air permeable vent.

BACKGROUND

Many electronic devices such as cellular phones, portable batteries, or other electronic devices that include batteries may be required to be waterproof. For example, the overall system may include a seal to prevent water, liquid, or other media from entering the device. This intrusion may cause damage to the electronic device. Different electronic devices may be rated depending on their resistance to ingress of liquid or other material. For instance, an electronic device may be rated depending on the amount of time the device can be submerged in a liquid and not have any ingress of the liquid. These tests may be time consuming and cumbersome in a production environment.

BRIEF SUMMARY

Aspects of the disclosure provide solutions that address and overcome technical problems associated with efficiently testing an electronic device with an air permeable vent.

Some aspects of this disclosure may relate to a method for liquid leak testing of an air permeable vent of a test unit, where the test unit is an electronic device that contains the air permeable vent or a portion of the electronic device that contains the air permeable vent. The method may comprise: (a) opening a test fixture; (b) inserting the test unit into a first member of the test fixture, where the first member of the test fixture includes: (1) a chamber, (2) a passage extending from a first opening of the chamber to a second opening on an engaging surface, and (3) a seal that surrounds the second opening of the passage and is configured to contact a sealing region on a first side of the test unit, where the sealing region includes the air permeable vent and a portion of an adjacent surface around the air permeable vent; (c) arranging a second member of the test fixture on a second side of the test unit; (d) engaging the seal to the adjacent surface around the air permeable vent creating the sealing region; (e) filling the passage and a first portion of the chamber with a predetermined volume of a liquid, where the liquid completely fills the passage such that the liquid completely covers the sealing region; (f) filling a second portion of the chamber with air to a predetermined air pressure; (g) measuring air pressure in the chamber over a predetermined time to determine a measured air pressure decay; and (h) comparing the measured air pressure decay to a predetermined air pressure decay. If the measured air pressure decay is greater than the predetermined air pressure decay, the test unit fails, and if the measured air pressure decay is less than the predetermined air pressure decay, the test unit passes. In some examples, the liquid may be water and the predetermined air pressure in the chamber may be 1.4 psi. The seal may be an O-ring, where the O-ring only contacts the adjacent surface around the air permeable vent on the first side of the test unit. When the measured air pressure decay is measured with a differential air pressure decay unit, the predetermined time may be within a range of 120 seconds and 240 seconds. The first member of the test fixture may include a liquid inlet that allows the liquid to flow into the chamber and a liquid drain that allows the liquid to flow out of the chamber. The first member of the test fixture may also include an air pressurizer port that allows the air in the chamber to be pressurized. In addition, the portion of the adjacent surface around the air permeable vent may extend at least 2 mm outward of the air permeable vent in every direction along the first side. The passage may extend from a rear surface of the chamber toward the engaging surface. The passage may also have a first perimeter that is within a range of 1 percent and 15 percent greater than a second perimeter of the air permeable vent, where the passage may have a generally cylindrical shape.

Other aspects of this disclosure may also relate to a method for liquid leak testing of an air permeable vent of a test unit, where the test unit is an electronic device that contains the air permeable vent or a portion of the electronic device that contains the air permeable vent. The method may comprise: (a) opening a test fixture; (b) inserting the test unit into a first member of the test fixture, where the first member of the test fixture includes: (1) a chamber and (2) a seal, where the seal is configured to contact a sealing region on a first side of the test unit and the sealing region includes the air permeable vent and a portion of an adjacent surface around the air permeable vent; (c) arranging a second member of the test fixture on a second side of the test unit; (d) engaging the seal to the adjacent surface around the air permeable vent creating the sealing region; (e) filling a first portion of the chamber with a predetermined volume of a liquid, where the liquid completely covers the sealing region; (f) filling a second portion of the chamber with a predetermined volume of air to a predetermined air pressure; (g) measuring air pressure in the chamber over a predetermined time to determine a measured air pressure decay; and (h) comparing the measured air pressure decay to a predetermined air pressure decay. If the measured air pressure decay is greater than the predetermined air pressure decay, the test unit fails, and if the measured air pressure decay is less than the predetermined air pressure decay, the test unit passes. The liquid used for the test method may be water. The first member of the test fixture may include a liquid inlet that allows the liquid to flow into the chamber and a liquid drain that allows the liquid to flow out of the chamber. The first member of the test fixture may also include an air pressurizer port that allows the air in the chamber to be pressurized. The first member of the test fixture may also further include a passage that extends from a rear surface of the chamber towards the sealing region on the test unit. The passage may have a first perimeter that is within a range of 1 percent and 15 percent greater than a second perimeter of the air permeable vent.

Still other aspects of this disclosure may relate to a method for liquid leak testing of an air permeable vent of a test unit, where the test unit is an electronic device that contains the air permeable vent or a portion of the electronic device that contains the air permeable vent. The test method may comprise: (a) opening a test fixture; (b) inserting the test unit into a first member of the test fixture, where the first member of the test fixture includes: (1) a chamber, (2) a passage extending from a first opening of the chamber to a second opening on an engaging surface, and (3) a seal that surrounds the second opening of the passage and is configured to contact a sealing region on a first side of the test unit, where the sealing region may include the air permeable vent and a portion of an adjacent surface around the air permeable vent and where the passage may have a first perimeter that is within a range of 1 percent and 15 percent greater than a second perimeter of the air permeable vent, and the engaging surface faces the first side of the test unit; (c) arranging a second member of the test fixture on a second side of the test unit; (d) engaging the seal to the adjacent surface around the air permeable vent creating the sealing region; (e) filling the passage and a first portion of the chamber with a predetermined volume of a liquid, where the liquid may completely fill the passage such that the liquid completely covers the sealing region; (f) filling a second portion of the chamber with a predetermined volume of air to a predetermined air pressure; (g) measuring air pressure in the chamber over a predetermined time to determine a measured air pressure decay; and (h) comparing the measured air pressure decay to a predetermined air pressure decay. If the measured air pressure decay is greater than the predetermined air pressure decay, the test unit fails, and if the measured air pressure decay is less than the predetermined air pressure decay, the test unit passes. The portion of the adjacent surface around the air permeable vent may extend at least 2 mm outward of the air permeable vent in every direction along the first side. The passage may extend from a rear surface of the chamber toward the engaging surface.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative arrangements, reference is made to the accompanying drawings, which form a part hereof, and in which is shown, by way of illustration, various arrangements in which aspects of the disclosure may be practiced. It is to be understood that other arrangements may be utilized, and structural and functional modifications may be made, without departing from the scope of the present disclosure. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. In addition, the term "substantially the same" as used herein may indicate that a value is within +/−5 percent of a comparative value. Nothing in this specification should be construed as requiring a specific three-dimensional orientation of structures in order to fall within the scope of this invention. It is noted that the accompanying drawings may not be drawn to scale. It is noted that various connections between elements are discussed in the following description. It is noted that these connections are general and, unless specified otherwise, may be direct or indirect, and that the specification is not intended to be limiting in this respect.

Many electronic devices such as cellular phones and battery packs may be sealed to prevent ingress of solid material and/or liquid material, for example, according to an IP67 rating, IP68 rating, or other ingress protection rating. The IP67 rating is specified by the Ingress Protection Code (IP Code) IEC standard 60529. The equivalent European standard is EN 60529. The IP Code also may be referred to as the International Protection Code. The IP Code classifies and rates a degree of ingress protection provided by mechanical casings and electrical enclosures for electronic equipment against intrusion, dust, accidental contact, and liquid (e.g., water). In the IP67 rating, the first digit (i.e., '6') specifies a level of protection offered against ingress of solid objects, while the second digit (i.e., '7') specifies a level of protection offered against ingress of liquids. The larger the value of the digit specifying the level of protection, the greater the amount of protection offered. For example, an IP67 rating specifies total protection against dust ingress and protection against liquid intrusion when the device is submerged in a liquid, such as water, at a depth of up to 1 meter for 30 minutes. Similarly, an IP68 rating specifies dust resistance and protection against liquid intrusion when the device is submerged in a liquid, such as water, at a depth over 1 meter for a minimum of 30 minutes or a set duration as specified.

In order to work properly, these sealed electronic devices may require an air permeable vent that allows gases to pass through the vent while preventing liquid to pass through the vent. One benefit of the air permeable vent is that it allows the electronic device to operate properly by helping to equalize air pressure within the device and the external environment. Another benefit of the air permeable vent is that it may also allow for any off gassing of a battery cell enclosed within the sealed electronic device. However, in order to ensure the air permeable vent and the attachment of the vent to the electronic device is operating properly; the electronic device needs to be tested. To test the operation of the vent and its attachment to the device, the device or the portion of the device that includes the air permeable vent may be submerged to the required depth for the required amount of time to meet the desired IP rating described above. However, in a production environment, this type of testing can be time consuming and cumbersome. The method and apparatus described below may reduce the time needed to ensure proper operation of the vent by allowing the vent and its surrounding area to be pressure decay leak tested using a liquid to create the seal around the vent. The method may include filling a chamber with a known volume of liquid to cover the vent. Then, a known remaining volume of air can be pressurized and monitored, to detect a leak either through the vent or the sealing surface around or between the vent and the substrate of the electronic device, a pressure decay unit may adequately determine a leak rate to determine if the electronic device will pass or fail the required IP rating.

Figure 1:
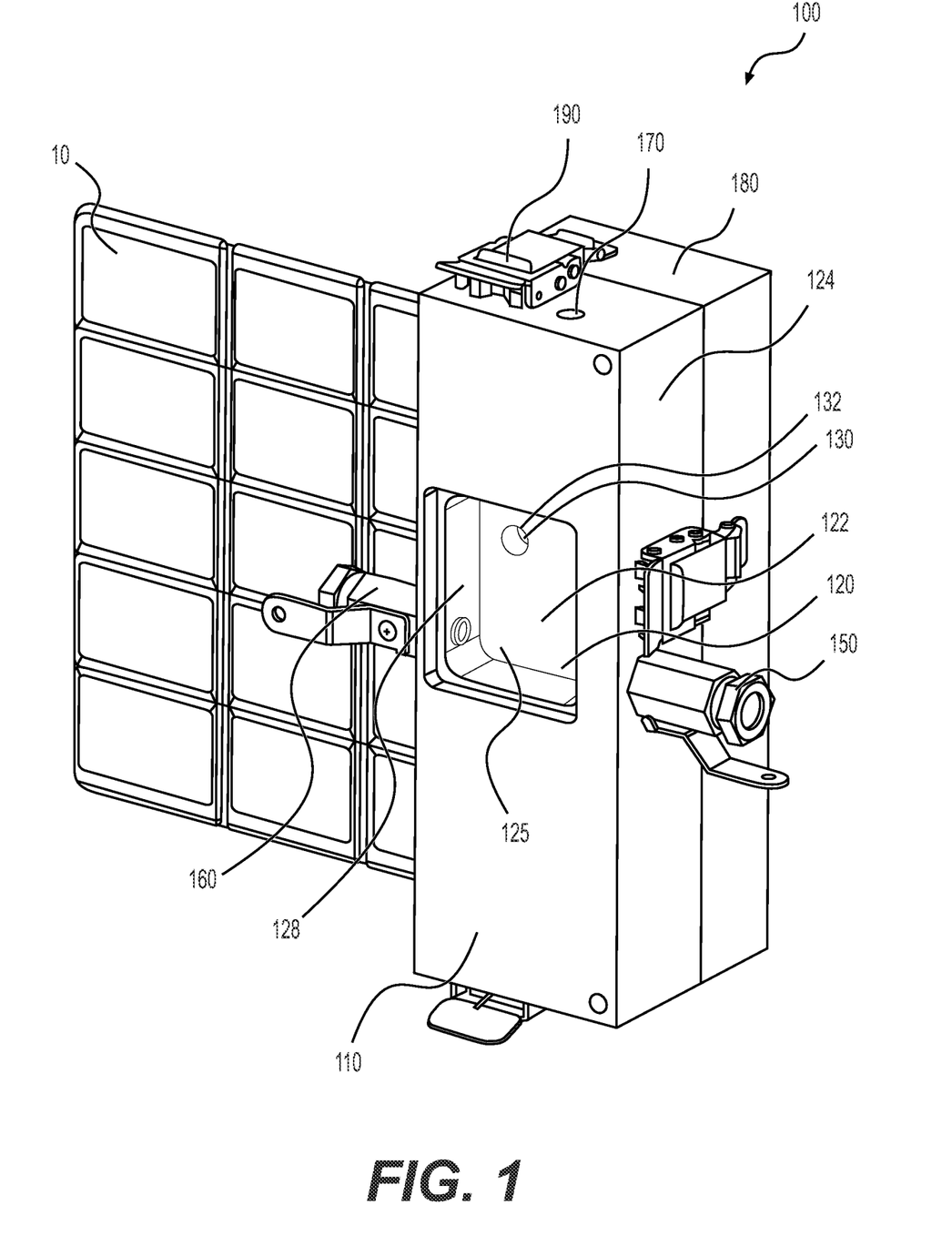
FIG. 1 illustrates a front perspective view of an exemplary test fixture mounted to an electronic device according to aspects described herein.
Figure 2:
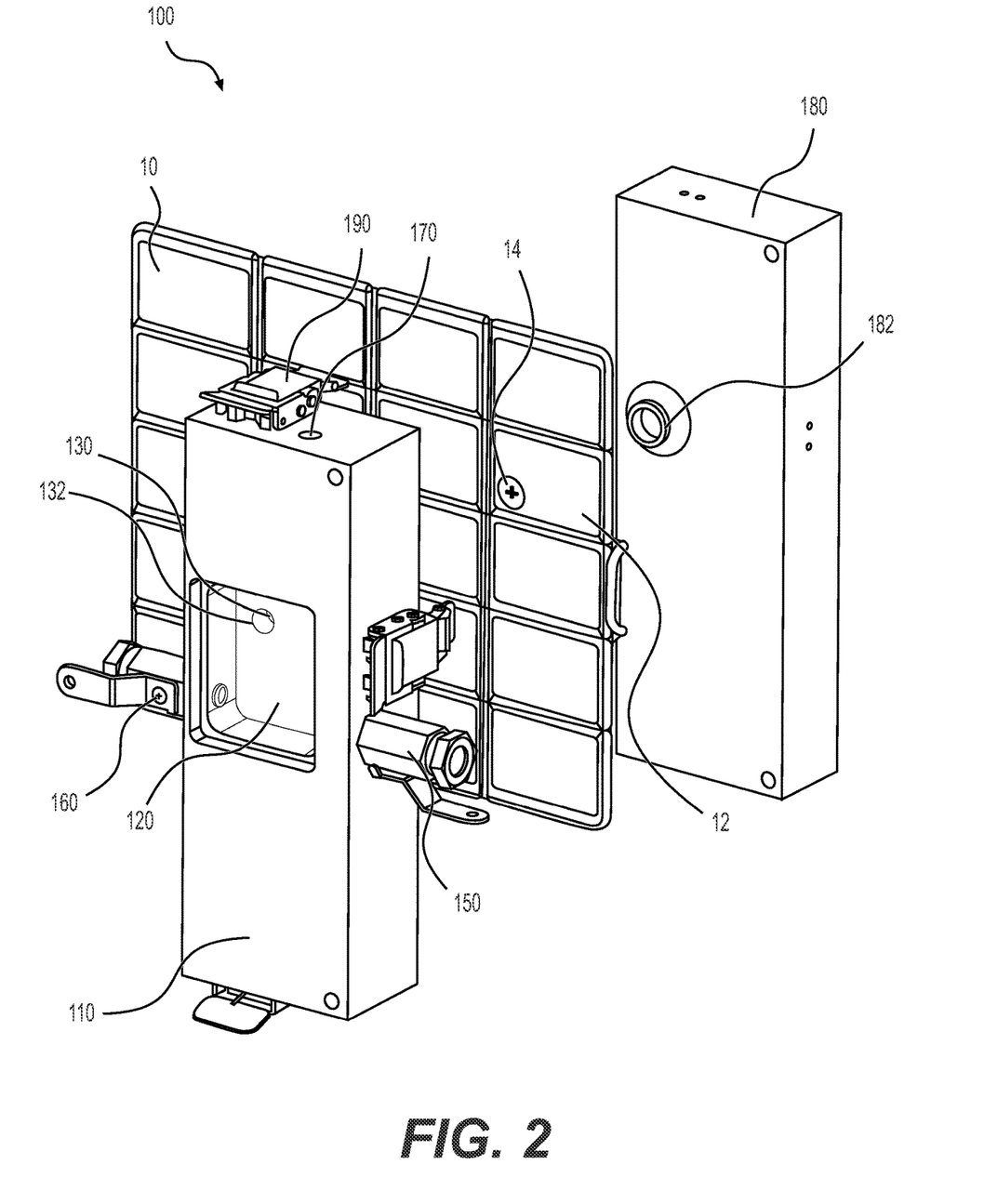
FIG. 2 illustrates a front exploded perspective view of the test fixture and electronic device of FIG. 1 according to aspects described herein.
Figure 3:
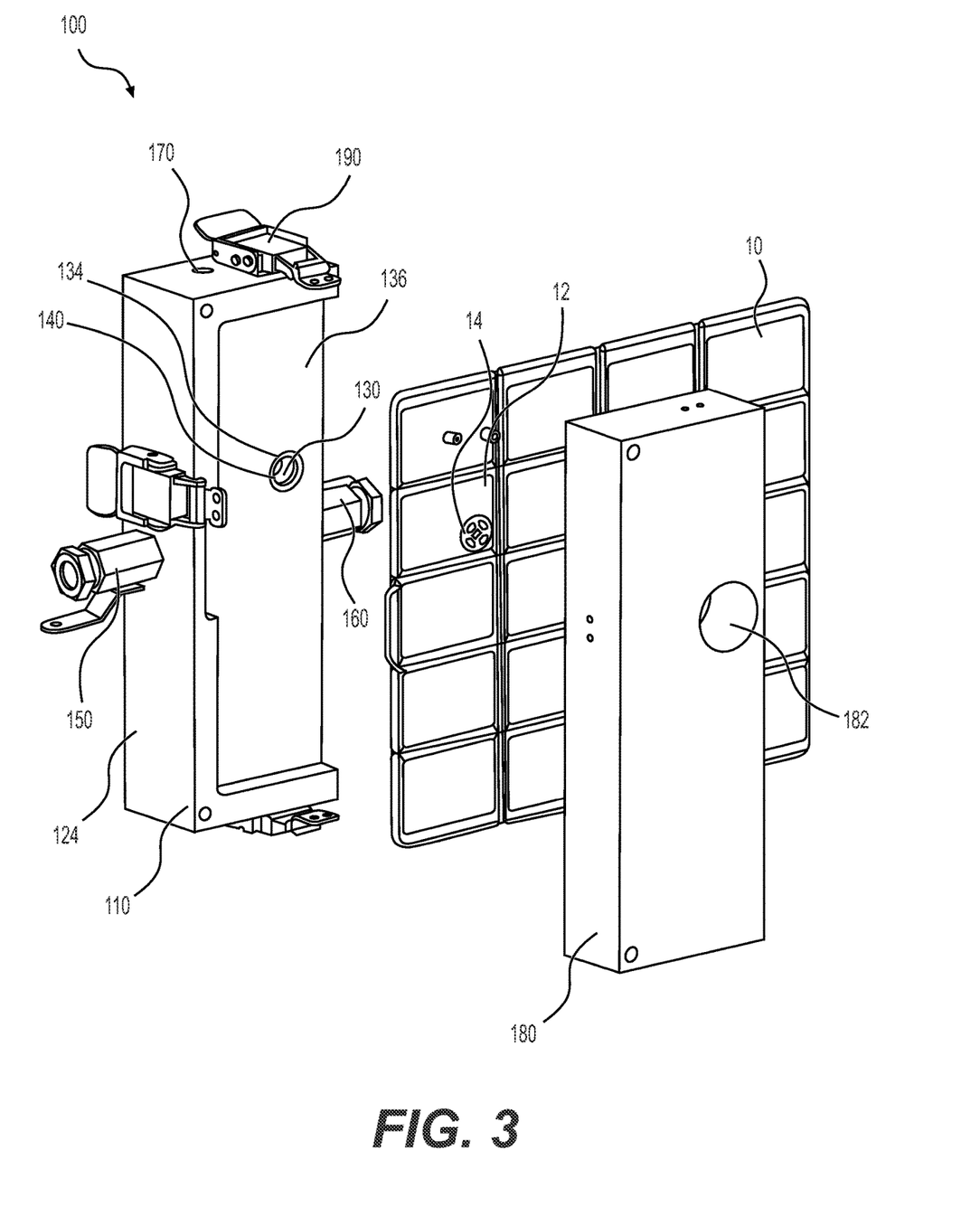
FIG. 3 illustrates a rear exploded perspective view of the test fixture and electronic device of FIG. 1 according to aspects described herein.

FIGS. 1-3 illustrates an exemplary test fixture 100 used to test an electronic device or portion of an electronic device 10 that includes an air permeable vent 14. The test fixture 100 may include a front member 110 and a rear member 180 positioned on opposite sides of the test unit 10. The test unit 10 may be an electronic device, such as a cellular phone, a battery pack, or other electronic device that may contain an air permeable vent 14. In addition, the test unit 10 may be a component or portion of an electronic device, such as a panel or a housing portion of an electronic device that contains an air permeable vent. The front member 110 may include a pressure chamber 120, a passage 130 extending from a first opening 132 in a rear surface 122 of the chamber 120 to a second opening 134 on an engaging surface 136 opposite the rear surface 122 of the chamber 120. The passage 130 may have a generally cylindrical shape as shown in the illustrated example. Alternatively, or optionally, the passage 130 may have a substantially rectangular cross-sectional shape or any geometric shape with a second opening 134 that generally follows a shape of the vent 14.

In addition, the front member 110 may include a liquid inlet 150 that extends from an exterior 124 of the front member 110 into the chamber 120 to allow liquid to enter the chamber 120 and a liquid drain 160 to allow liquid to be drained from the chamber 120. Both the liquid inlet 150 and liquid drain 160 may have valves that can help to seal the chamber when the valves are closed. An air pressurizer port 170 may also extend from an exterior 124 of the front member 110 into the chamber 120 to allow the air in the chamber 120 to be pressurized. The air pressurizer port 170 may have a different orientation that the liquid inlet 150 or liquid drain 160 or in some examples, may have the same orientation. For example, the air pressurizer port 170 may be substantially vertically oriented while liquid inlet 150 and liquid drain 160 may be substantially horizontally oriented. Alternatively, or optionally, the air pressurizer port 170 may be substantially horizontally oriented and the liquid inlet 150 or liquid drain 160 may be substantially vertically oriented. In addition, the air pressurizer port 170 may be located above on a different surface than the liquid inlet 150 or liquid drain 160. For example, as shown in the illustrated example, the air pressurizer port 170 is arranged to enter the chamber 120 from a top surface 126, while the liquid inlet 150 and liquid drain 160 are arranged to enter the chamber from side surfaces 128 that are opposite each other. In some examples, the chamber 120 may include a window 125 with a translucent or transparent material.

The front member 110 may also include a seal 140 that surrounds the second opening 134 of the passage 130. The seal 140 may be retained in a groove or other retention feature in the engaging surface 136. The front member 110 may be clamped together with the rear member 180 using clamps 190 to secure the test fixture 100 together and to ensure the seal 140 is properly engaged with the front surface 12 of the test unit 10. As another option, the front member 110 may not include a passage 130, but only have a chamber 120 where the seal 140 extends around a perimeter of an opening of the chamber 120 to engage the sealing region 16 of the test unit 10.

Figure 5A:
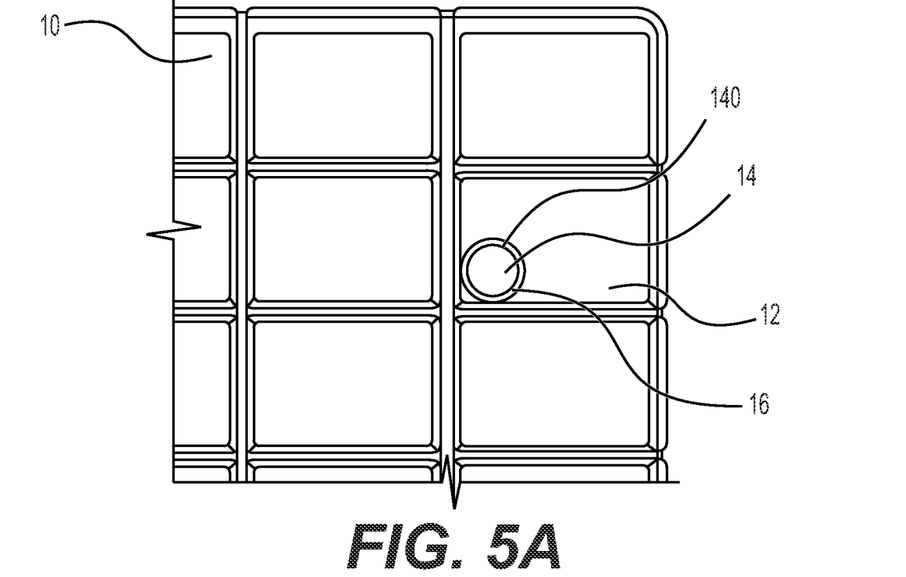
FIG. 5A illustrates a front view of the test fixture and electronic device of FIG. 1 with components removed for clarity according to aspects described herein.
Figure 5B:
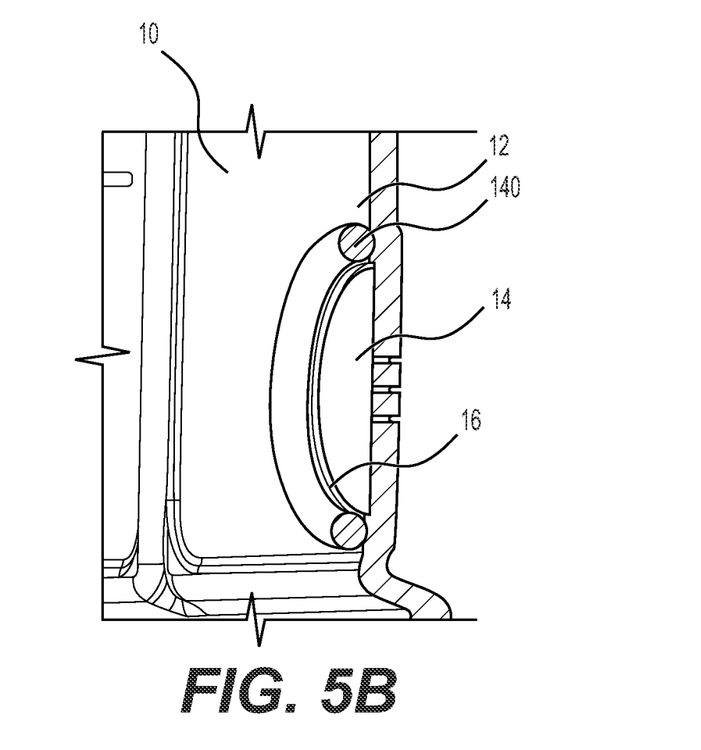
FIG. 5B illustrates a perspective cross-sectional view of the test fixture and electronic device of FIG. 5A with components removed for clarity according to aspects described herein.

As discussed above, the test fixture 100 may include a seal 140 that engages the front surface 12 of the test unit 10. When the seal 140 is engaged with the test unit 10, the seal 140 may form a liquid tight (i.e. watertight) and an airtight boundary around a sealing region 16 on the front surface 12 of the test unit 10 that allows the chamber 120 to be hold the liquid and the pressurized air. This sealing region 16 may be defined as a region of the test unit 10 that includes the air permeable vent 14 along with a portion of the adjacent surface that surrounds the vent 14. Because the test unit 10 may have a leak path through the vent 14 or a leak path through a joint attaching the vent 14 to the surrounding surface or surrounding surfaces, the sealing region 16 may include the entire vent 14 along with a portion of the front surface 12 that is adjacent to and surrounds the vent 14. As shown in FIGS. 5A and 5B, the seal 140 may surround the second opening 134 of the passage 130 and contact the sealing region 16 on a front surface 12 of the test unit 10. The seal 140 may be formed from an elastomeric or rubber material, such as an O-ring or other compressible gasket material that is able to be form a liquid tight and an airtight seal when compressed. The seal 140 may only contact the adjacent surface or surfaces around the air permeable vent 14 on the front side 12 of the test unit 10 as shown in FIG. 5B. It should be noted that FIGS. 5A and 5B are illustrated with the front member 110 and rear member 180 removed to clearly show the arrangement of the seal 140 with the sealing region 16 of the test unit 10. In some examples, the portion of the adjacent surfaces around the air permeable vent that comprise the sealing region 16 may extend at least 2 mm outward of the air permeable vent 14 in every direction along the front surface. Additionally, in some examples, the passage 130 may have a perimeter that is approximately 10 percent greater than a perimeter of the air permeable vent 14, or in some examples, the passage 130 may have a perimeter within a range of 1 percent and 15 percent greater than a perimeter of the air permeable vent 14.

Figure 4:
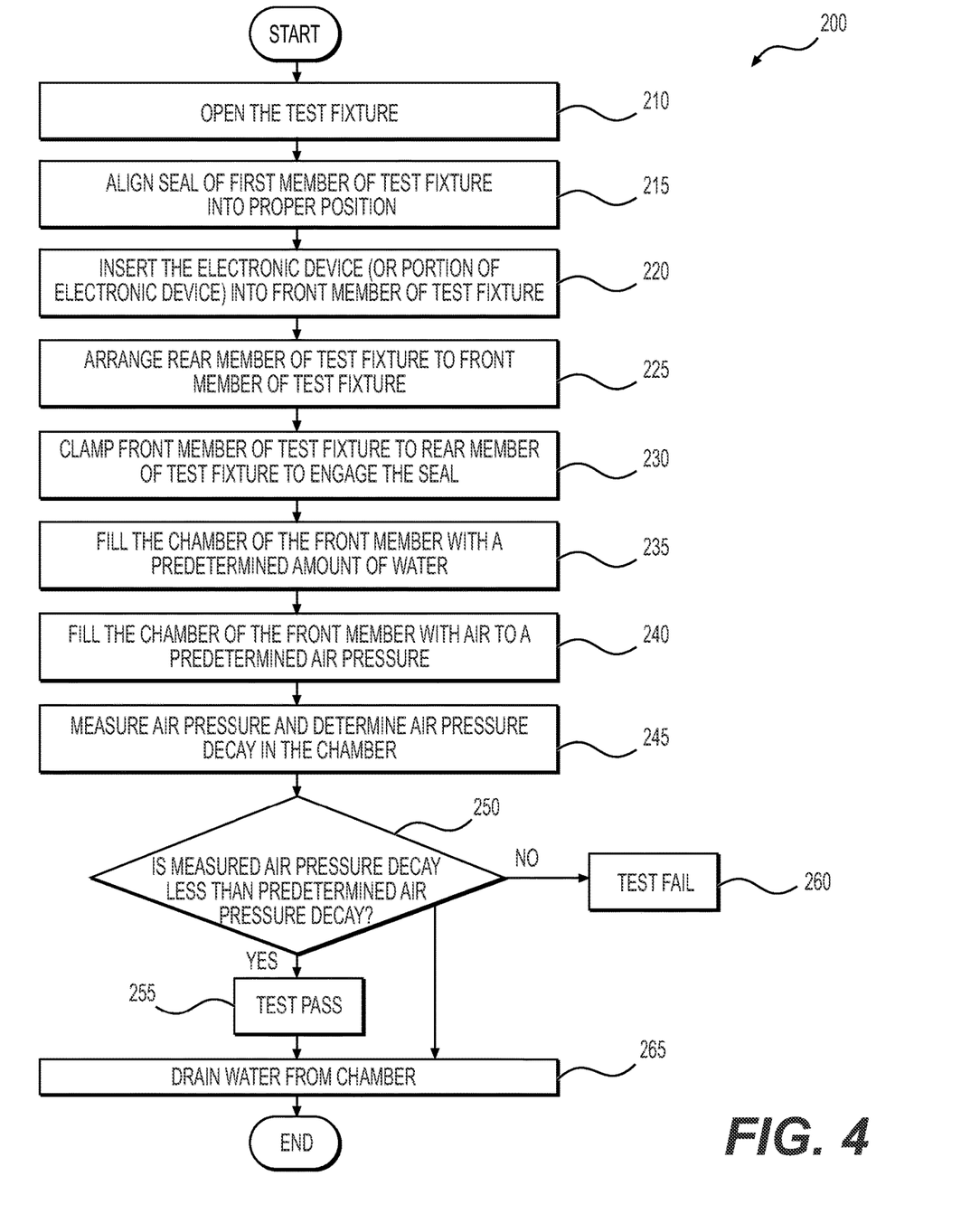
FIG. 4 illustrates a flowchart of a method for detecting a leak.
Figure 6:
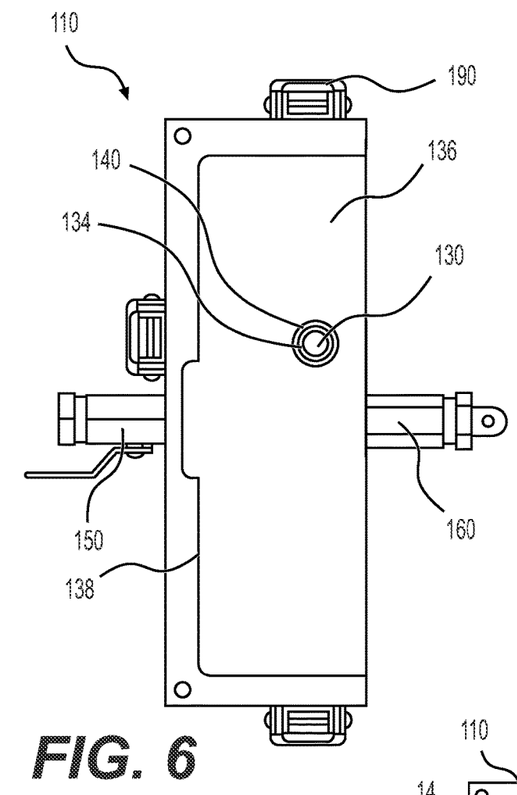
FIG. 6 illustrates a rear view of a front member of the test fixture of FIG. 1 according to aspects described herein.
Figure 7:
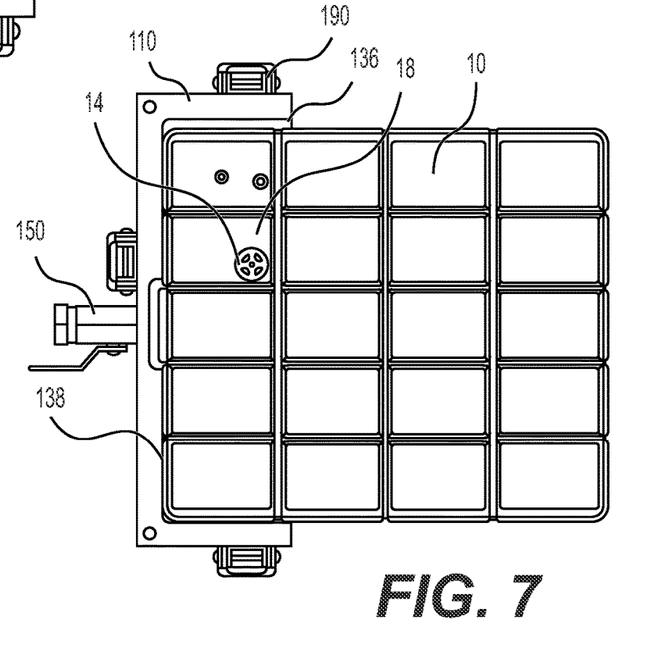
FIG. 7 illustrates a rear view of the front member of the test fixture of FIG. 1 with the electronic device installed according to aspects described herein.

As shown in FIG. 4, a method 200 for detecting a leak in an electronic device 10 with an air permeable vent 14 using the test fixture 100 may include multiple steps. A first step (210) may include opening the test fixture 100 by separating the front member 110 and the rear member 180. Next, the test unit 10 may be arranged such that a center of the air permeable vent 14 is aligned with a center of the seal 140 (215) and placed onto the engaging surface 136 of the front member 110 as shown in FIG. 7 (220). The engaging surface 136 may face or, in some examples, contact the front surface 12 of the test unit 10. The engaging surface 136 may also include a lip 138 around the perimeter to help align the test unit 10 into the front member 100 as shown in FIGS. 6 and 7.

Figure 8:
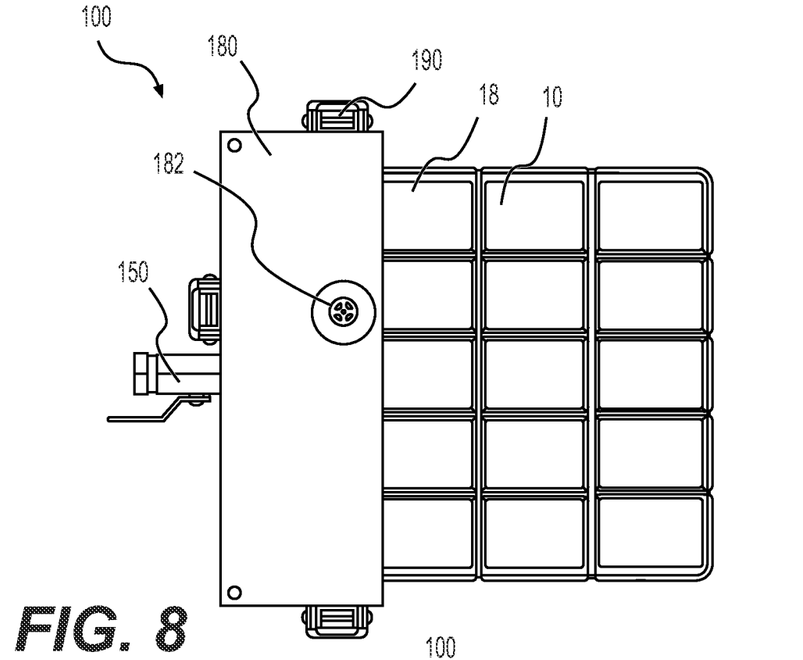
FIG. 8 illustrates a rear view of the test fixture and electronic device of FIG. 1 according to aspects described herein.

Next, the rear member 180 may be arranged and aligned with a rear side 18 of the test unit 10 (225). Once the rear member 180 is assembled to the front member 110, then the front member 110 and rear member 180 may be clamped together using the clamps 190 to engage the seal 140 along the sealing region 16 of the test unit 10 (230) as shown in FIG. 8. It is contemplated that the seal 140 may engage the front surface 12 of the test unit 10 by means other than the illustrated clamps 190, such as a force applied to either of the test fixture members 110, 180 to cause the seal 140 to compress against and engage the front surface 12. This force may be applied mechanically, such as by clamping or other actuation means like a pneumatic system, or a hydraulic system.

Figure 9:
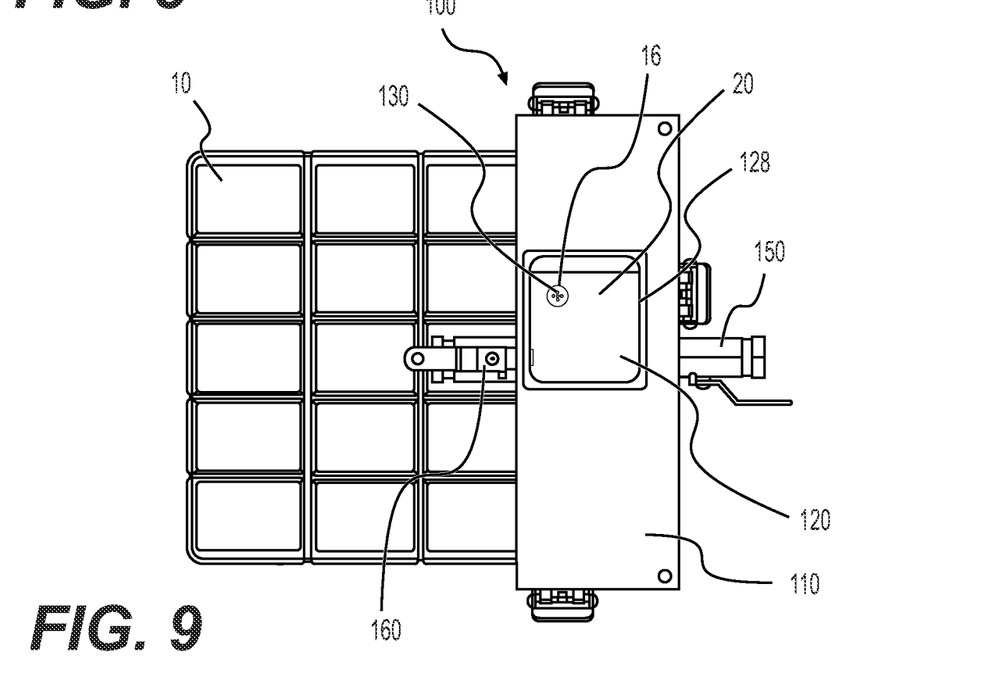
FIG. 9 illustrates a front view of the test fixture and electronic device of FIG. 1 with liquid added to the chamber according to aspects described herein.

Once, the seal 140 is engaged with a front surface 12 of the test unit 10, a portion of the chamber 120 may be filled with a predetermined amount of a liquid 20, where the liquid 20 completely fills the passage 130 and completely covers the sealing region 16 (235) as shown in FIG. 9. The liquid may be determined by the specific media required by the specific IP rating, such as water (which may include both saltwater and fresh water), oil, or other liquid material. For example, if the IP rating sought for the test unit is to be waterproof with an IP rating of IP67, the liquid used in method 200 may be water. The chamber 120 may not be completely filled whereas the chamber 120 includes a portion that can be filled with air. Because the chamber 120 and passage 130 have a known volume, the volume of liquid 20 added to the chamber 120 is predetermined to ensure proper coverage of the passage 130 and vent 14. The window 125 may provide a user an ability a visual check that the height of the liquid 20 to ensure it is at a proper height. In addition, the rear member 180 may have a rear opening 182 to provide an additional location for a user to visually check if a liquid leak is present as shown in FIG. 8. This rear opening 182 may be aligned with the vent 14 and help to ensure the rear member 180 is properly aligned. Inlet 150 and drain 160 may have valves that are closed once the liquid is filled to create a closed chamber.

Figure 10:
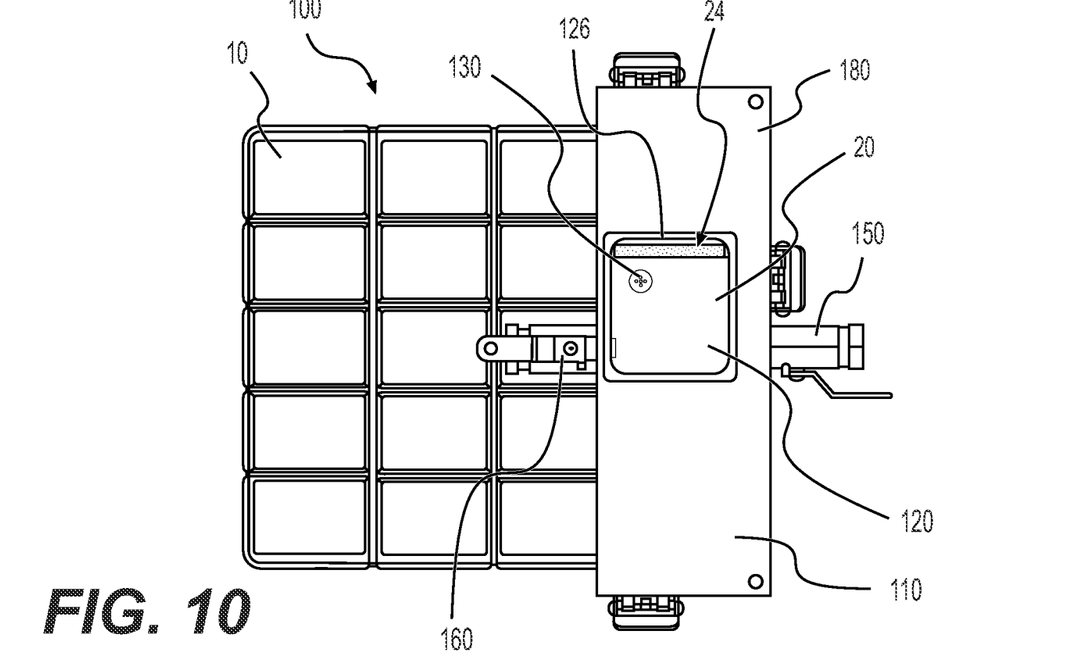
FIG. 10 illustrates a front view of the test fixture and electronic device of FIG. 1 with liquid and pressurized air added to the chamber according to aspects described herein.
Figure 11:
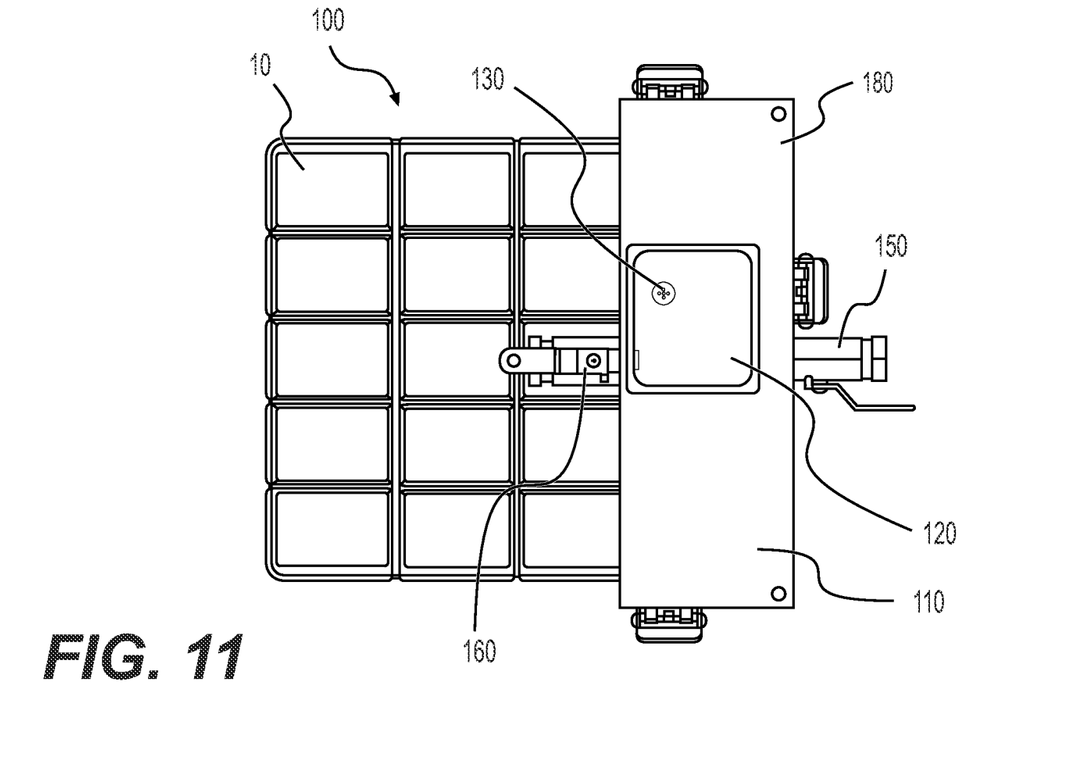
FIG. 11 illustrates a front view of the test fixture and electronic device of FIG. 1 with an empty chamber according to aspects described herein.

Next, air 24 may be filled into the remaining volume of the chamber 120 through the air pressurizer port 170 with a predetermined volume of air until the air pressure in the chamber 120 reaches a predetermined air pressure (240) as shown in FIG. 10. The volume of air used for each test should be the same or substantially the same for each test. The volume of air used for each test should be kept to a minimum as the test time may be directly related to the volume of air in the chamber 120. The predetermined air pressure may be determined by the air pressure that corresponds to the depth requirement of the desired IP rating of the test unit 10. By using an equivalent hydrostatic pressure as the predetermined air pressure, the method 200 may recreate the appropriate environmental conditions on the test unit 10. For instance, an IP rating with a second digit of "7", as described above, may require the test unit 10 to be submerged in water at a depth of up to 1 meter. At a water depth of 1 meter, an equivalent air pressure corresponds to an air pressure of 1.4 psi. Accordingly, the predetermined air pressure may be set to 1.4 psi. As another example, the predetermined air pressure for an IP rating with a second digit of "8" may be 2.1 psi.

The leak detection method 200 may utilize multiple means to determine the air pressure decay. The air pressurizer port 170 may be connected to a differential pressure decay unit (not shown), an air pressure gauge (not shown), an air pressure decay unit (not shown), other means to monitor the air pressure within the chamber. The air pressure decay units or the air pressure gauge may measure minute changes in the measured air pressure and therefore any small leaks may be determined quickly. A differential air pressure decay unit may measure the air pressure decay of the volume of air in the chamber 120 against a known reference volume of air. The pressure decay sees any differences between the rate of pressure loss between the air in the chamber and the reference volume of air as indication of a leak. The air pressure in the chamber may be measured over a predetermined amount of time to determine the air pressure decay of the air in the chamber 120 (245). In some examples, when using a differential air pressure decay unit, the predetermined measurement time to test the test unit may be within a range of 120 and 240 seconds, or in some cases the measurement time may be within a range of 100 seconds and 150 seconds. Using an air pressure gauge or a standard air pressure decay unit may require a longer predetermined measurement time compared to the test time needed for the differential air pressure decay unit. The measured air pressure decay is then compared to a predetermined air pressure decay (250) that has been previously determined as passing the required IP rating. If the measured air pressure decay is less than the predetermined air pressure decay, the test unit 10 passes (255), and if the measured air pressure decay is greater than the predetermined air pressure decay, the test unit 10 fails. Lastly, the drain valve of the liquid drain 160 is opened to allow the liquid 20 to drain from the chamber 120.

The test fixture 100 may be formed from metallic materials using machining or other processes known to one skilled in the art. The test fixture 100 may be arranged in an orientation such that when testing such that the liquid 20 within the chamber 120 typically fills a portion of the chamber 120 that allows the air to fill an upper portion of the chamber 120.

Aspects of the disclosure have been described in terms of illustrative examples thereof. Numerous other examples, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method for liquid leak testing of an air permeable vent of a test unit, wherein the test unit is an electronic device that contains the air permeable vent or a portion of the electronic device that contains the air permeable vent, comprising:

opening a test fixture;

inserting the test unit into a first member of the test fixture, wherein the first member of the test fixture includes a chamber, a passage extending from a first opening of the chamber to a second opening on an engaging surface, and a seal that surrounds the second opening of the passage and is configured to contact a sealing region on a first side of the test unit, wherein the sealing region includes the air permeable vent and a portion of an adjacent surface around the air permeable vent;

arranging a second member of the test fixture on a second side of the test unit;

engaging the seal to the adjacent surface around the air permeable vent creating the sealing region;

filling the passage and a first portion of the chamber with a predetermined volume of a liquid, wherein the liquid completely fills the passage such that the liquid completely covers the sealing region;

filling a second portion of the chamber with air to a predetermined air pressure;

measuring air pressure in the chamber over a predetermined time to determine a measured air pressure decay; and comparing the measured air pressure decay to a predetermined air pressure decay, wherein if the measured air pressure decay is greater than the predetermined air pressure decay, the test unit fails, and if the measured air pressure decay is less than the predetermined air pressure decay, the test unit passes.

2. The method of claim 1, wherein the liquid is water.

3. The method of claim 2, wherein the predetermined air pressure in the chamber is 1.4 psi.

4. The method of claim 1, wherein the seal is an O-ring, wherein the O-ring only contacts the adjacent surface around the air permeable vent on the first side of the test unit.

5. The method of claim 1, wherein when the measured air pressure decay is measured with a differential air pressure decay unit, the predetermined time is within a range of 120 seconds and 240 seconds.

6. The method of claim 1, wherein the first member of the test fixture includes a liquid inlet that allows the liquid to flow into the chamber and a liquid drain that allows the liquid to flow out of the chamber.

7. The method of claim 1, wherein the first member of the test fixture includes an air pressurizer port that allows the air in the chamber to be pressurized.

8. The method of claim 1, wherein the portion of the adjacent surface around the air permeable vent extends at least 2 mm outward of the air permeable vent in every direction along the first side.

9. The method of claim 1, wherein the passage extends from a rear surface of the chamber toward the engaging surface.

10. The method of claim 1, wherein the passage has a first perimeter that is within a range of 1 percent and 15 percent greater than a second perimeter of the air permeable vent.

11. The method of claim 1, wherein the passage has a generally cylindrical shape.

12. A method for liquid leak testing of an air permeable vent of a test unit, wherein the test unit is an electronic device that contains the air permeable vent or a portion of the electronic device that contains the air permeable vent, comprising:
opening a test fixture;
inserting the test unit into a first member of the test fixture, wherein the first member of the test fixture includes a chamber and a seal, wherein the seal is configured to contact a sealing region on a first side of the test unit and the sealing region includes the air permeable vent and a portion of an adjacent surface around the air permeable vent;
arranging a second member of the test fixture on a second side of the test unit;
engaging the seal to the adjacent surface around the air permeable vent creating the sealing region;
filling a first portion of the chamber with a predetermined volume of a liquid, wherein the liquid completely covers the sealing region;
filling a second portion of the chamber with a predetermined volume of air to a predetermined air pressure;
measuring air pressure in the chamber over a predetermined time to determine a measured air pressure decay; and
comparing the measured air pressure decay to a predetermined air pressure decay, wherein if the measured air pressure decay is greater than the predetermined air pressure decay, the test unit fails, and if the measured air pressure decay is less than the predetermined air pressure decay, the test unit passes.

13. The method of claim 12, wherein the liquid is water.

14. The method of claim 12, wherein the first member of the test fixture includes a liquid inlet that allows the liquid to flow into the chamber and a liquid drain that allows the liquid to flow out of the chamber.

15. The method of claim 12, wherein the first member of the test fixture includes an air pressurizer port that allows the air in the chamber to be pressurized.

16. The method of claim 12, wherein the first member of the test fixture further includes a passage that extends from a rear surface of the chamber towards the sealing region on the test unit.

17. The method of claim 16, wherein the passage has a first perimeter that is within a range of 1 percent and 15 percent greater than a second perimeter of the air permeable vent.

18. A method for water leak testing of an air permeable vent of a test unit, wherein the test unit is an electronic device that contains the air permeable vent or a portion of the electronic device that contains the air permeable vent, comprising:
opening a test fixture;
inserting the test unit into a first member of the test fixture; wherein the first member of the test fixture includes a chamber, a passage extending from a first opening of the chamber to a second opening on an engaging surface, and a seal that surrounds the second opening of the passage and is configured to contact a sealing region on a first side of the test unit, wherein the sealing region includes the air permeable vent and a portion of an adjacent surface around the air permeable vent, wherein the passage has a first perimeter that is within a range of 1 percent and 15 percent greater than a second perimeter of the air permeable vent, and the engaging surface faces the first side of the test unit;
arranging a second member of the test fixture on a second side of the test unit;
engaging the seal to the adjacent surface around the air permeable vent creating the sealing region;
filling the passage and a first portion of the chamber with a predetermined volume of water, wherein the water completely fills the passage such that the water completely covers the sealing region;
filling a second portion of the chamber with a predetermined volume of air to a predetermined air pressure;
measuring air pressure in the chamber over a predetermined time to determine a measured air pressure decay; and
comparing the measured air pressure decay to a predetermined air pressure decay, wherein if the measured air pressure decay is greater than the predetermined air pressure decay, the test unit fails, and if the measured air pressure decay is less than the predetermined air pressure decay, the test unit passes.

19. The method of claim 18, wherein the portion of the adjacent surface around the air permeable vent extends at least 2 mm outward of the air permeable vent in every direction along the first side.

20. The method of claim 18, wherein the passage extends from a rear surface of the chamber toward the engaging surface.

* * * * *